Sept. 10, 1957  K. RIESS ET AL  2,805,734
PROCESS FOR PREVENTING FROST FROM FORMING IN
COOLERS FOR THE CONDENSATION OF VOLATILE
SUBSTANCES FROM MOIST CARRIER GASES
Filed Nov. 30, 1954
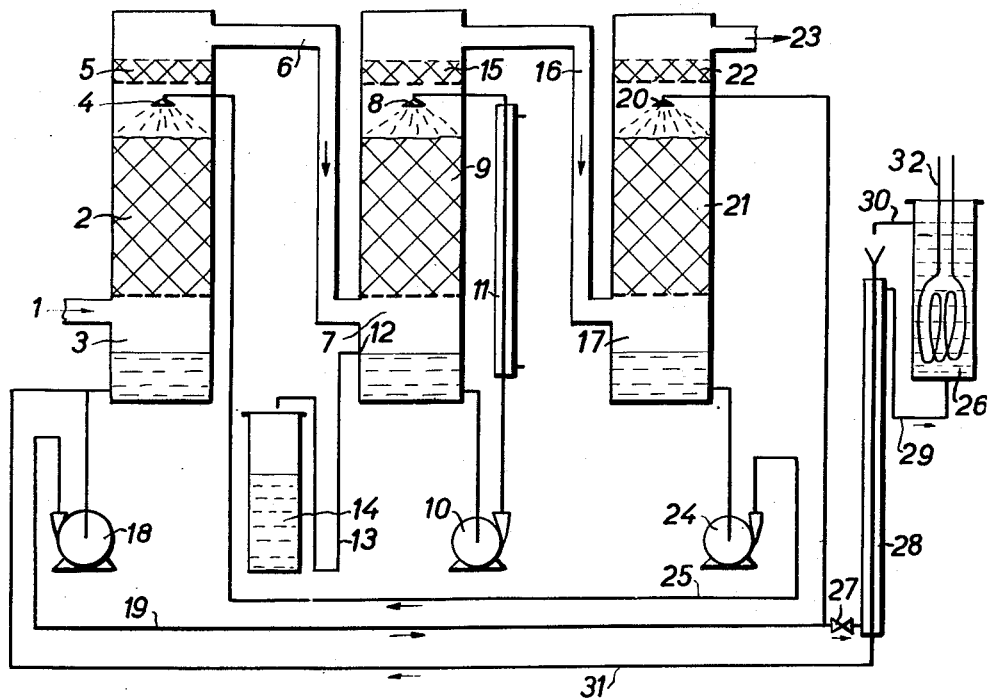
INVENTORS:
KURT RIESS
ALFRED HALTMEIER
BY Burgess and Dinklage
ATTORNEY

United States Patent Office 2,805,734
Patented Sept. 10, 1957

2,805,734

PROCESS FOR PREVENTING FROST FROM FORMING IN COOLERS FOR THE CONDENSATION OF VOLATILE SUBSTANCES FROM MOIST CARRIER GASES

Kurt Riess and Alfred Haltmeier, Leverkusen-Bayerwerk, Germany, assignors to Farbenfabriken Bayer Aktiengesellschaft, Leverkusen, Germany, a corporation of Germany Application November 30, 1954, Serial No. 472,238

Claims priority, application Germany December 5, 1953

11 Claims. (Cl. 183—120)

This invention relates to a process for preventing frost from forming in coolers for the condensation of volatile substances from moist carrier gases.

Volatile substances, for example solvents such as methylene chloride in the manufacture of film, are recovered to an increasing extent by cooling carrier gases containing them. For this purpose temperatures lower than the freezing point of water are usually used, as a result of which the cooling surfaces become covered with frost. The cooling effect of the cooling surfaces is reduced owing to this frosting. The formation of a condensate is reduced to a much greater extent, since the ice crystals entrained by the flow of gas act as condensation nuclei for the volatile substances to be condensed and entrain the latter in the form of droplets of mist. The resultant fall in output is considerable. The volatile substances do not condense even when the amount of frosting is only moderate. In actual practice, two or three cooling towers arranged in parallel are used, and of these one is always being defrosted while another is in operation.

One of the main disadvantages of such an arrangement is that the time required for the condensation is not constant, nor is the water content of the recovered solvent.

The present invention provides a process for preventing frost from forming in coolers on cooling surfaces on which volatile substances are condensed from moist carrier gases, especially solvent substances such as methylene chloride in the manufacture of film, wherein the gas mixture entering the cooler is pre-cooled before it reaches the cooling surfaces, without condensing the volatile substance, until the dew point of the gas mixture is reduced to or below the temperature of the cooling surfaces, by passing an aqueous liquid with a lower vapour pressure than water in countercurrent to the gas mixture entering the cooler and in circulation between the gas mixture entering, and the gas mixture leaving, the cooler.

By operating in this manner, the formation of frost on the cooling surfaces is prevented, since the temperature of these surfaces is not below the lowered dew point of the water vapour contained in the carrier gases. The cooler can then condense the volatile substances, contained in the carrier gases without being impeded by the formation of frost. It thus becomes possible for the volatile substances to be condensed in the condensate which is formed at the cooling surfaces and which is cooled by circulation, without fear of clogging due to ice crystals.

The following example read in conjunction with the drawing which shows a flow sheet of an embodiment for effecting the process and explains more fully the process of the present invention:

*Example*

100 mols of a gas mixture which at $+32°$ C. consists of 80 mols of air, 19.7 mols of methylene chloride and 0.3 mol of water vapour, are cooled to $+12°$ C. in direct countercurrent with a lithium bromide solution which is at a temperature of $4°$ C. and which consists of 19 mols of lithium bromide dissolved in 70 mols of water the gases which contain the volatile matter and water vapor entering at 1 into column 3 which is filled with a packing material 2. In this way, the water vapour content of the gas mixture is reduced to 0.2 mol. The due point drops to $-13.2°$ C. The amount of methylene chloride remains unchanged as the precooling serves only to reduce the water vapor content. In the course of the countercurrent treatment the lithium bromide solution is heated to $+16°$ C. After this pre-cooling the gas mixture flows through a bed 5 where any entrained particles may be removed and then through conduit 6 into column 7 the cooler proper. The cooler has cooling surfaces which consist for example, of a layer of packing material 9, which is cooled by contact with cold liquid methylene chloride. A large amount of methylene chloride in liquid form trickles down these cooling surfaces and, together with the additional methylene chloride which condenses here, is pumped by the pump 10 through the cooler 11 where the same is cooled to $-13°$ C. and returned to the said cooling surfaces by means of the shower head 8. In this trickling cooling process the gas mixture is cooled to $-12°$ C., and the amount of methylene chloride contained therein is reduced to 10 mols. 9.7 mols of methylene chloride condense and are taken up by the cooling liquid, in circuit whose amount is kept constant by means of an overflow 12, the overflow of liquid flowing through conduit 13 into collecting vessel 14 placed beneath it. The gas mixture leaving the cooler consists of 80 mols of air, 10 mols of methylene chloride and 0.2 mol of water vapour. This gas mixture exiting from column 7 passing through bed 15 where any entrained particles may be removed and through conduit 16 into column 17 is treated in countercurrent, either directly or through heat-exchanging walls, with the lithium bromide solution which comes from the initial cooling and which is at a temperature of $16°$ C.; in this treatment the gas mixture is heated to $12°$ C., while the lithium bromide solution is cooled to $+4°$ C. and is recycled at this temperature back to the pre-cooler via conduit 25 to the column 3 where it is distributed through distributing device 4 over the packing material 2, i. e. is circulated between the gas mixture entering, and the gas mixture leaving, the cooler. The water content of the lithium bromide solution, which slowly rises owing to the water being taken up from the gas mixture, is kept at a constant level, for example by passing a small part of the solution at $16°$ through a heat exchanger 28 to an evaporator 26, where it is evaporated and returned into the circulation again after heat exchange with the solution flowing in.

We claim:

1. In a process in which a volatile substance is condensed from a moist carrier gas on a cooling surface, the improvement for preventing frost from forming on said cooling surface which comprises passing an aqueous liquid with a lower vapor pressure than water in countercurrent contact with the gas mixture being passed to and leaving the cooling surface, said aqueous liquid being passed in contact with the gas mixture being passed to the cooling surfaces having a temperature sufficiently low to reduce the dew point of the gas mixture to at least as low as the temperature of the cooling surfaces without condensing any of the volatile substances contained therein.

2. Improvement according to claim 1 in which the gas mixture being passed to the cooling surfaces has a temperature sufficiently low to reduce the dew point of the gas mixture to the temperature of the cooling surfaces.

3. Improvement according to claim 1 in which the gas mixture being passed to the cooling surfaces has a temperature sufficiently low to reduce the dew point of the gas mixture to a temperature below the temperature of the cooling surfaces.

4. Improvement according to claim 1 which includes substantially continuously cooling and recycling a liquid mass of the volatile substance to be condensed in contact with the cooling surfaces.

5. Improvement according to claim 4 which includes substantially and continuously removing an amount of liquid corresponding to the condensed volatile substance from the circulating mass.

6. Improvement according to claim 1 in which said aqueous liquid contains lithium bromide.

7. Improvement according to claim 1 in which said gas mixture contains methylene chloride.

8. In a process in which a volatile substance is condensed from a moist carrier gas on a cooling surface, the improvement for preventing frost from forming on said cooling surface, which comprises passing an aqueous liquid with a lower vapor pressure than water in countercurrent contact with the gas mixture leaving the cooling surface to thereby cool said aqueous liquid and thereafter passing said aqueous liquid in contact with the gas mixture being passed to the cooling surface at a temperature sufficiently low to reduce the dew point of the gas mixture to at least as low as the temperature of the cooling surface without condensing the volatile substance contained therein.

9. Improvement according to claim 8, in which said aqueous liquid contains lithium bromide.

10. Improvement according to claim 9, in which said gas mixture contains methylene chloride.

11. Improvement according to claim 10, which includes substantially continuously cooling and recycling a liquid mass of the volatile substances to be condensed in contact with the cooling surfaces to thereby cool the same.

References Cited in the file of this patent

UNITED STATES PATENTS

| | | |
|---|---|---|
| 2,162,158 | Coey | June 13, 1939 |
| 2,311,466 | Pechukas | Feb. 16, 1943 |
| 2,700,431 | Sutter | Jan. 25, 1955 |